(12) United States Patent  
Chmiel et al.

(10) Patent No.: US 9,171,035 B2  
(45) Date of Patent: Oct. 27, 2015

(54) CONTROL ELEMENTS OF GRAPHICAL USER INTERFACES

(75) Inventors: Matthew S. Chmiel, Ottawa (CA); Jason Hiltz-Laforge, Ottawa (CA); Alireza Pourshahid, Ottawa (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/610,669

(22) Filed: Sep. 11, 2012

(65) Prior Publication Data

US 2013/0007651 A1    Jan. 3, 2013

Related U.S. Application Data

(63) Continuation of application No. 13/172,249, filed on Jun. 29, 2011.

(51) Int. Cl.
*G06F 3/048*  (2013.01)
*G06F 17/30*  (2006.01)

(52) U.S. Cl.
CPC .... *G06F 17/30398* (2013.01); *G06F 17/30554* (2013.01); *G06F 17/30572* (2013.01); *G06F 17/30592* (2013.01)

(58) Field of Classification Search
CPC .............................................. G06F 17/30398
USPC ........................................................ 715/771
See application file for complete search history.

(56) References Cited

U.S. PATENT DOCUMENTS

| | | | |
|---|---|---|---|
| 5,892,510 A * | 4/1999 | Lau et al. ....................... | 715/866 |
| 5,946,375 A | 8/1999 | Pattison et al. | |
| 5,966,126 A | 10/1999 | Szabo | |
| 6,301,579 B1 | 10/2001 | Becker | |
| 6,750,864 B1 * | 6/2004 | Anwar ........................... | 345/440 |
| 7,076,502 B2 | 7/2006 | Shoup et al. | |
| 7,269,786 B1 * | 9/2007 | Malloy et al. ................. | 715/212 |
| 7,287,032 B2 | 10/2007 | Attili et al. | |
| 7,516,084 B1 | 4/2009 | Sankaran et al. | |
| 7,747,939 B2 * | 6/2010 | Thanu et al. .................. | 715/212 |
| 7,756,907 B2 | 7/2010 | Stolte et al. | |
| 7,774,303 B2 | 8/2010 | Shoup et al. | |
| 7,873,676 B2 | 1/2011 | Jain et al. | |

(Continued)

OTHER PUBLICATIONS

The Multidimensional Data Model available at http://www.stanford.edu/dept/itss/docs/oracle/10g/olap.101/b10333/multimodel.htm as of Sep. 8, 2006.*

(Continued)

*Primary Examiner* — William Bashore
*Assistant Examiner* — Nathan Shrewsbury
(74) *Attorney, Agent, or Firm* — Shumaker & Sieffert, P.A.

(57) ABSTRACT

Various aspects of this disclosure are directed to displaying, by a computing device, a plurality of components of a graphical user interface. Each of the plurality of components may display one or more members of at least one dimensional level of a database having a plurality of dimensions. Each dimension of the plurality of dimensions may include one or more dimensional levels. The computing device may determine a first dimensional level of a first dimension of the plurality of dimensions having one or more members displayed in two or more of the plurality of components, and may display a control element including an indication of the dimensional level having the one or more members displayed in each of the two or more components.

8 Claims, 6 Drawing Sheets

(56) References Cited

U.S. PATENT DOCUMENTS

| | | |
|---|---|---|
| 7,996,378 B2 | 8/2011 | Wang et al. |
| 8,055,610 B2 | 11/2011 | Wilhite |
| 8,073,777 B2* | 12/2011 | Barry et al. ............. 705/50 |
| 2002/0087568 A1* | 7/2002 | LeDonne et al. ............. 707/100 |
| 2004/0006574 A1* | 1/2004 | Witkowski et al. ........ 707/104.1 |
| 2004/0015470 A1 | 1/2004 | Smith et al. |
| 2004/0034616 A1* | 2/2004 | Witkowski et al. ............. 707/1 |
| 2004/0119759 A1 | 6/2004 | Barros |
| 2004/0128150 A1 | 7/2004 | Lundegren |
| 2005/0102284 A1* | 5/2005 | Srinivasan et al. ............. 707/4 |
| 2005/0216421 A1* | 9/2005 | Barry et al. ............. 705/64 |
| 2006/0004693 A1* | 1/2006 | Ramanathan et al. ............. 707/2 |
| 2006/0026209 A1* | 2/2006 | Burrill et al. ............. 707/104.1 |
| 2006/0190432 A1 | 8/2006 | Wang et al. |
| 2006/0271841 A1* | 11/2006 | Thanu et al. ............. 715/503 |
| 2007/0150562 A1* | 6/2007 | Stull et al. ............. 709/223 |
| 2007/0220013 A1 | 9/2007 | Rabines et al. |
| 2007/0233621 A1* | 10/2007 | de Souza et al. ............. 706/11 |
| 2008/0005210 A1 | 1/2008 | Covington et al. |
| 2008/0163125 A1 | 7/2008 | Gu et al. |
| 2008/0177590 A1* | 7/2008 | Brodsky et al. ............. 705/7 |
| 2008/0228800 A1* | 9/2008 | Dettinger et al. ............. 707/102 |
| 2008/0235231 A1* | 9/2008 | Gass et al. ............. 707/9 |
| 2009/0031236 A1* | 1/2009 | Robertson et al. ............. 715/765 |
| 2009/0177625 A1 | 7/2009 | Saxena et al. |
| 2009/0313035 A1* | 12/2009 | Esser et al. ............. 705/1 |
| 2009/0322782 A1 | 12/2009 | Kimchi et al. |
| 2010/0070491 A1* | 3/2010 | Cragun et al. ............. 707/722 |
| 2010/0083160 A1* | 4/2010 | Hayes et al. ............. 715/772 |
| 2010/0161374 A1* | 6/2010 | Horta et al. ............. 705/9 |
| 2010/0251156 A1 | 9/2010 | Cantwell |
| 2010/0287488 A1* | 11/2010 | Barnett et al. ............. 715/771 |
| 2010/0299304 A1* | 11/2010 | Vasudevan ............. 707/602 |
| 2010/0312747 A1 | 12/2010 | Stolte et al. |
| 2011/0035744 A1 | 2/2011 | Bhatia |
| 2011/0119227 A1 | 5/2011 | Wang et al. |
| 2011/0314400 A1* | 12/2011 | Mital et al. ............. 715/771 |
| 2012/0005198 A1* | 1/2012 | Pontier et al. ............. 707/723 |
| 2012/0089934 A1* | 4/2012 | Senjalia ............. 715/771 |
| 2012/0110515 A1* | 5/2012 | Abramoff et al. ............. 715/854 |
| 2012/0137223 A1* | 5/2012 | Nicol et al. ............. 715/730 |
| 2012/0180108 A1* | 7/2012 | Siklos et al. ............. 726/3 |

OTHER PUBLICATIONS

Few, "Intelligent Design: Introducing Tableau 3.0", Visual Business Intelligence Newsletter, Apr. 2007, pp. 1-13.

Admin. 21, View and Analyze Data with Visualizations and Dashboards in Microsoft Dynamics CRM, Result on demand, a CRM 2011 (aka CRM 5.0) blog, http://www.resultondemand.com/blog/post, Sep. 2010 (2 pages).

Office Action from U.S. Appl. No. 13/172,249, dated Jul. 31, 2013, 18 pages.

Amendment from related U.S. Appl. No. 13/172,249 filed on Oct. 8, 2013 (12 pages).

Examiner's Interview Summary from related U.S. Appl. No. 13/172,249 dated Oct. 11, 2013 (3 pages).

Final Office Action dated Nov. 8, 2013 in U.S. Appl. No. 13/172,249, 18 pgs.

Response filed Jan. 8, 2014 to the Final Office Action dated Nov. 8, 2013 in U.S. Appl. No. 13/172,249, 17 pgs.

Office Action from U.S. Appl. No. 13/172,249, dated Jul. 16, 2014, 19 pp.

Response to Office Action mailed Jul. 16, 2014, from U.S. Appl. No. 13/172,249, filed Oct. 16, 2014, 10 pp.

* cited by examiner

| ALL YEARS ▼ | ALL MATERIALS ▼ |
|---|---|

| PRICE | CHEMICALS | MISCELLANEOUS | PACKAGING | PARTS |
|---|---|---|---|---|
| 1998 | 90,000.00 | 0.00 | -7,358.48 | 40,000.00 |
| 1999 | 100,000.00 | 5,118.12 | 2,300.00 | 50,000.00 |

| COST | CHEMICALS | MISCELLANEOUS | PACKAGING | PARTS |
|---|---|---|---|---|
| 1998 | 70,000.00 | 0.00 | 4,118.00 | 23,000.00 |
| 1999 | 80,000.00 | 1,000.00 | 5,000.00 | 27,000.00 |

| LABOR HOURS | MIDWEST DIVISION | PACIFIC DIVISION | EASTERN DIVISION |
|---|---|---|---|
| 1998 | 214,836.00 | 472,591.00 | 0.00 |
| 1999 | 231,104.00 | 449,717.00 | 64,082.00 |

FIG. 3A

| 1999 ▼ | ALL MATERIALS ▼ |

| PRICE | CHEMICALS | MISCELLANEOUS | PACKAGING | PARTS |
|---|---|---|---|---|
| 1999 Q 1 | 22,000.00 | 1,218.06 | 587.00 | 12,773.00 |
| 1999 Q 2 | 26,000.00 | 1,268.46 | 574.00 | 12,281.00 |
| 1999 Q 3 | 28,000.00 | 1,311.63 | 561.00 | 12,340.00 |
| 1999 Q 4 | 24,000.00 | 1,319.97 | 578.00 | 12,606.00 |

| COST | CHEMICALS | MISCELLANEOUS | PACKAGING | PARTS |
|---|---|---|---|---|
| 1999 Q 1 | 21,000.00 | 273.12 | 1,240.00 | 5,843.00 |
| 1999 Q 2 | 18,500.00 | 264.88 | 1,268.00 | 6,357.00 |
| 1999 Q 3 | 19,700.00 | 196.40 | 1,253.00 | 7,116.00 |
| 1999 Q 4 | 20,800.00 | 265.60 | 1,239.00 | 7,684.00 |

| LABOR HOURS | MIDWEST DIVISION | PACIFIC DIVISION | EASTERN DIVISION |
|---|---|---|---|
| 1999 Q 1 | 57,200.00 | 112,005.00 | 5,761.00 |
| 1999 Q 2 | 58,114.00 | 111,423.00 | 10,449.00 |
| 1999 Q 3 | 56,012.00 | 113,238.00 | 23,475.00 |
| 1999 Q 4 | 59,778.00 | 113,051.00 | 24,397.00 |

FIG. 3B

CONTROL ELEMENTS OF GRAPHICAL USER INTERFACES

This application is a continuation of Ser. No. 13/172,249, filed on Jun. 29, 2011, entitled CONTROL ELEMENTS OF GRAPHICAL USER INTERFACES, the entire content of which is incorporated herein by reference.

BACKGROUND

This disclosure relates to graphical user interfaces, and more specifically, to control elements of graphical user interfaces.

Computing devices may provide a graphical user interface (GUI) that displays information of the computing device in human-readable form. A GUI may enable users to interact with the computing device by manipulating graphical elements of the GUI. For example, graphical elements may include taskbars, virtual buttons, drop-down lists, and other user interface elements that may provide mechanisms for inputting data by which to configure a computing device to perform certain tasks, such as display information. In some examples, GUIs may display information of a database, and may enable users to manipulate elements of the GUI to view different members or different dimensions of the database.

In certain examples, GUIs may enable a user to create customized components that group user interface elements of the GUI. In some instances, a user may create multiple customized components to create a customized report. For example, a user may create a report including a first component that displays sales data of a particular line of products in the current year and a second component that displays the projected sales data for that same product line in the following year.

BRIEF SUMMARY

In one example, a method includes displaying, by a computing device, a plurality of components of a graphical user interface, wherein each of the plurality of components displays one or more members of at least one dimensional level of a database having a plurality of dimensions, and wherein each dimension of the plurality of dimensions includes one or more dimensional levels. The method further includes determining, by the computing device, a first dimensional level of a first dimension of the plurality of dimensions having one or more members displayed in two or more of the plurality of components, and displaying, by the computing device, a control element including an indication of the dimensional level having the one or more members displayed in each of the two or more components.

In one example, a computer-readable storage medium is encoded with instructions that, when executed, cause one or more processors of a computing device to display a plurality of components of a graphical interface, wherein each of the plurality of components displays one or more members of at least one dimensional level of a database having a plurality of dimensions, and wherein each dimension of the plurality of dimensions includes one or more dimensional levels. The computer-readable storage medium is further encoded with instructions that, when executed, cause the one or more processors of the computing device to determine a first dimensional level of a first dimension of the plurality of dimensions having one or more members displayed in two or more of the plurality of components, and display a control element that includes an indication of the dimensional level having the one or more members displayed in each of the two or more components.

In one example, a computing device includes one or more processors, and a component management module, executable by the one or more processors to display a plurality of components of a graphical user interface, wherein each of the plurality of components displays one or more members of at least one dimensional level of a database having a plurality of dimensions, and wherein each dimension of the plurality of dimensions includes one or more dimensional levels. The computing device further includes a control management module, executable by the one or more processors to determine a first dimensional level of a first dimension of the plurality of dimensions having one or more members displayed in two or more of the plurality of components, and display a control element including an indication of the dimensional level having the one or more members displayed in each of the two or more components.

The details of one or more aspects of this disclosure are set forth in the accompanying drawings and the description below. Other features, objects, and advantages of the disclosure will be apparent from the description and drawings, and from the claims.

BRIEF DESCRIPTION OF THE SEVERAL VIEWS OF THE DRAWINGS

FIGS. 3A and 3B are screen illustrations of example graphical user interfaces that include dynamically generated control elements, in accordance with one or more aspects of this disclosure.

DETAILED DESCRIPTION

Figure 1:
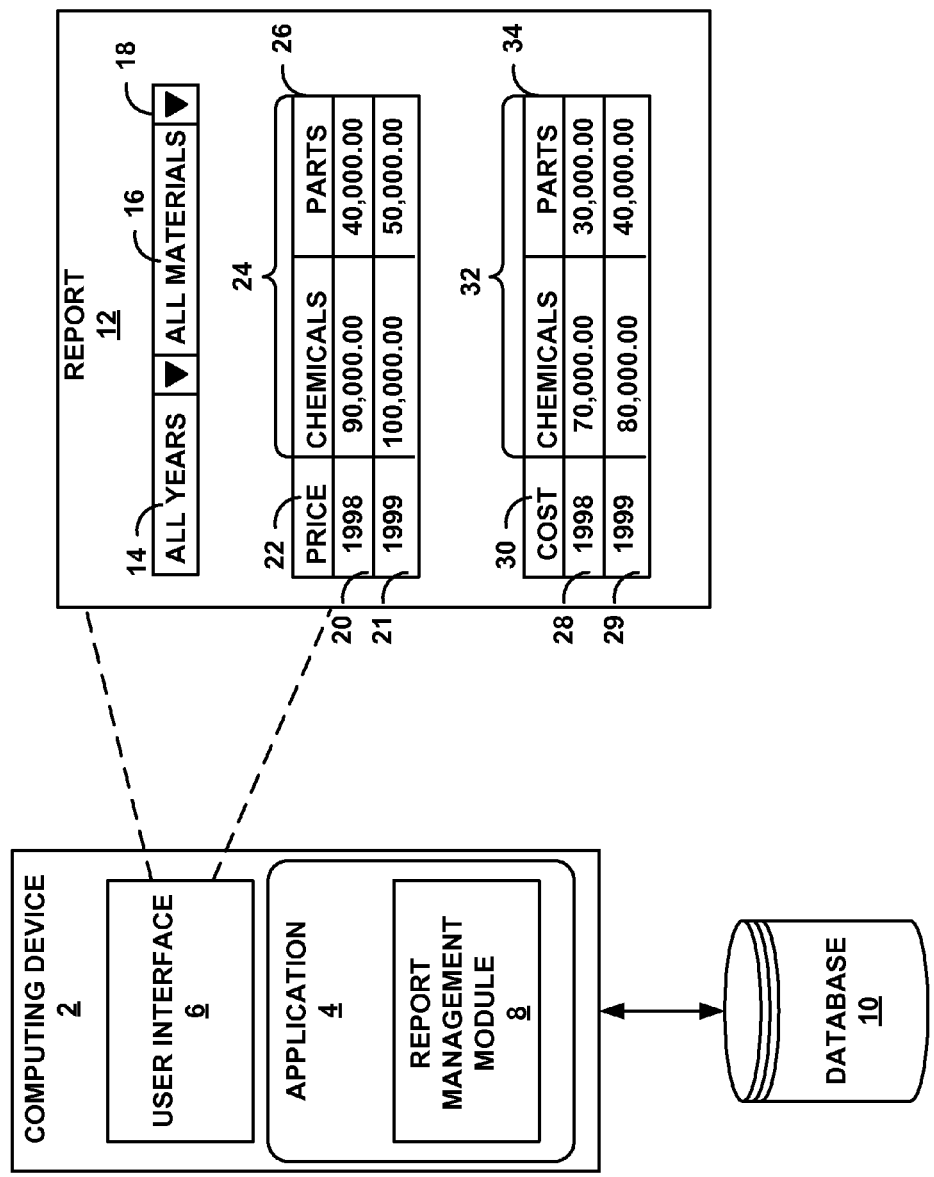
FIG. 1 is a block diagram illustrating an example computing system for dynamically generating control elements of a graphical user interface, in accordance with one or more aspects of this disclosure.

Computing devices may provide a graphical user interface (GUI) that displays information, such as information of a database. The GUI may enable users to manipulate user interface elements to view different members, different dimensions, or different dimensional levels of the database. In some examples, users may create customized components of the GUI to view particular information of the database. For instance, a user may create a customized sales data component that displays sales data for a selectable product line for a selectable year. In certain examples, users may create customized reports by grouping multiple customized components. For example, a user may create a customized cost data component that displays cost data for a selectable product line for a selectable year, and may combine the sales data component and the cost data component to create a customized report. In such a way, a user may create a report that presents a particular view of the information stored in the database (e.g., sales data versus cost data for a product line) using the various customized components.

In such an example, to change the product line or year displayed in the report, a user typically must select the new product line or year in each of the components of the report. Moreover, in many cases, users may create reports using components that include related data, such as by creating a component that is a variation of a previous component with one or more dimensions altered (e.g., sales data per year versus cost data per year). Such reports may include numerous components, thereby requiring the user to make many manual selections to change related data displayed across the numerous components. In addition to being time consuming and tedious, the multiple manual selections may detract from a user's ability to focus on the displayed data and relationships among the displayed data. Rather, the user may be focused on ensuring that all of the potentially numerous components have been correctly updated with the new selection.

In accordance with techniques of this disclosure, a user may use a computing device to create a report including a price data component, displaying price data for a selectable product line for a selectable year, and a cost data component, displaying cost data for a selectable product line for a selectable year. The computing device may automatically determine that each of the components displays members of at least one common dimensional level of the database. For instance, the computing device may automatically determine that each of the components displays members of a year dimensional level of a time dimension of the database. Similarly, the computing device may automatically determine that each of the components displays members of a product line dimensional level of a products dimension of the database.

The computing device may create a control element that includes an indication of the one or more common dimensional levels. For example, the computing device may create a control element that includes an indication of the year dimensional level and the product line dimensional level. To change the members displayed in each of the components, the user may select a dimensional level using the control element. In response, the computing device may update each of the components to cause each of the components to display members of the selected level. For instance, the user may use the control element to select the level of the product line dimension representing a particular product line (e.g., lawnmowers). In response, the computing device may update both the price data component and the cost data component to display the relevant data (i.e., price data for the price data component and cost data for the cost data component) for the members of the particular product line. Similarly, the user may update the displayed members of the year dimensional level of both components by making a single selection of a particular year using the control element. In response, the computing device may update both the price data component and cost data component to display the relevant data for the particular year. As such, techniques of this disclosure may simplify the process of updating the displayed members of a dimensional level of a database in two or more components of a GUI.

Techniques of this disclosure may provide one or more advantages. For example, one or more aspects of this disclosure may, in various instances, enable a user to update, with a single selection, two or more components that display one or more members of a dimensional level of a database. By providing a mechanism to update multiple components with a single selection, techniques of this disclosure may reduce the number of selections made by the user when updating components of the GUI. Furthermore, reducing the number of selections made by the user may reduce the number of errors made by the user when updating the various components.

FIG. 1 is a block diagram illustrating an example computing system for dynamically generating control elements of a graphical user interface, in accordance with one or more aspects of this disclosure. Computing device 2, in some examples, may include or be a part of a portable computing device (e.g., a mobile phone, netbook, laptop, personal digital assistant (PDA), tablet device, and the like), desktop computer, or server. As shown in FIG. 1, computing device 2 may include user interface 6, and may execute application 4 that includes report management module 8. Computing device 2 may access database 10. In some examples, database 10 may be part of computing device 2, such as a database stored in one or more storage devices of computing device 2. In certain examples, database 10 may be part of one or more devices that are separate from computing device 2, such as one or more servers that computing device 2 may access using a wired or wireless network or both. For example, computing device 2 may use a communications unit of computing device 2 to access database 10 using a telephone network such as a cellular telephone network, a wide-area network such as the Internet, a local-area network (LAN), an enterprise network, or one or more other types of networks.

Examples of database 10 may include, but are not limited to, relational databases, multi-dimensional databases, hierarchical databases, object-oriented databases, or one or more other types of databases. As one example, database 10 may be a multi-dimensional database. The multi-dimensional database may include a group of dimensions having one or more dimensional levels. Each dimensional level may include one or more dimensional members. For example, a time dimension may include year and quarter dimensional levels. The year dimensional level may include 1999, 2000, and 2001 dimensional members. The quarter dimensional level may include quarter one (Q1), quarter two Q2, quarter three (Q3) and quarter four (Q4) dimensional members. Each of the dimensions may also be considered members of the multi-dimensional database.

Information within a multi-dimensional database may be identified using an intersection of the members of the dimensional levels. For example, the intersection of a member of a year dimensional level of a time dimension (e.g., a particular year) with a quarter dimensional level of the time dimension may identify the information associated with the quarters of the particular year. Similarly, the intersection of a member of a price dimensional level of a measures dimension with a member of a materials dimension of the database (e.g., a particular material) may identify the price of the particular material.

As an example, a multi-dimensional database may include a time dimension. The time dimension may be considered a member of the multi-dimensional database. The highest level of the time dimension (i.e., the highest level of the hierarchical structure formed by the levels of the time dimension) may include the year dimensional level. The year dimensional level may include a group of members including each of the years 1990 through 2010, as one example. The time dimension may include a quarter dimensional level that may include the dimensional members Q1, Q2, Q3, and Q4. The dimensional levels may form a hierarchical structure within the dimension that may be referred to using a familial hierarchical structure. For instance, the year dimensional level may be the parent of the quarter dimensional level. Similarly, the quarter dimensional level may be referred to as the child of the year dimensional level. The multi-dimensional database may include any number of dimensional levels that may each include any number of members.

As another example, a multi-dimensional database may include a products dimension. The products dimension may be considered a member of the multi-dimensional database, and may include a highest level products line dimension. The products line dimension may include, for example, a group of lawnmowers, tractors, and trailers dimensional members. The products dimension may also include a model dimensional level that includes a group of dimensional members representing the various models of products. The model dimensional level may be the child of the products line dimension.

Various aspects of this disclosure may enable a user to view data stored in database 10, and to efficiently update the displayed members of a dimensional level of a database in two or more components of a GUI. As shown in FIG. 1, application 4 may execute on computing device 2. Application 4 may be a reporting application to generate reports to view data stored in database 10. Application 4 may include report management module 8 that may cause user interface 6 to generate a graphical user interface including report 12. Report 12 may include price component 26 and cost component 34. In the example of FIG. 1, price component 26 displays the members of the price dimensional level 22 of database 10 of materials 24 for each of years 20 and 21. Cost component 34 displays the members of the cost dimensional level 30 of database 10 of materials 32 for each of years 28 and 29. For instance, price component 26 displays the price "90,000.00" for the "chemicals" material in the year "1998," and cost component 34 displays the cost "40,000.00" for the "parts" material in the year "1999."

In the example of FIG. 1, years 20, 21, 28, and 29 may be members of the year dimensional level of the time dimension of database 10. Materials 24 and materials 32 may be members of the materials dimensional level of the products dimension of database 10. Report management module 8 may determine that components 26 and 34 each display one or more members of the year dimensional level of the time dimension of database 10. Similarly, management module 8 may determine that components 26 and 34 each display one or more members of the materials dimensional level of the products dimension of database 10. Report management module 8 may display control element 18, including indications of the dimensional levels having one or more members displayed in each of components 26 and 34. For instance, in the example of FIG. 1, control element 18 includes drop-down list 14 and drop-down list 16. Drop-down list 14 includes the indication "all years" of the year dimensional level of the time dimension (i.e., an indication of the dimensional level of the time dimension with one or more members displayed in components 26 and 34). Drop-down list 18 includes the "all materials" indication of the materials dimensional level of the products dimension (i.e., an indication of the dimensional level of the products dimension with one or more members displayed in components 26 and 34).

In certain examples, a user may select a member of a dimensional level of the time dimension using drop-down list 14 (e.g., the 1999 member of the year dimensional level), or may select a member of a dimensional level of the materials dimension using drop-down list 16 (e.g., the chemicals member of the materials dimensional level). Report management module 8 may receive the selection of the member of the dimensional level and may update each of components 26 and 34 to display one or more members of a child dimensional level of the selected dimensional level. For instance, a user may select the 1999 member of the year dimensional level using drop-down list 14. In response, report management module 8 may update both price component 26 and cost component 34 to display the members of the quarter dimensional level corresponding to the 1999 member of the year dimensional level (e.g., 1999 Q1, 1999 Q2, 1999 Q3, and 1999 Q4). As such, computing device 2 may enable a user to efficiently cause each of components 26 and 34 to display the members of a selected dimensional level of a dimension of database 10 using one selection of control element 18.

Figure 2:
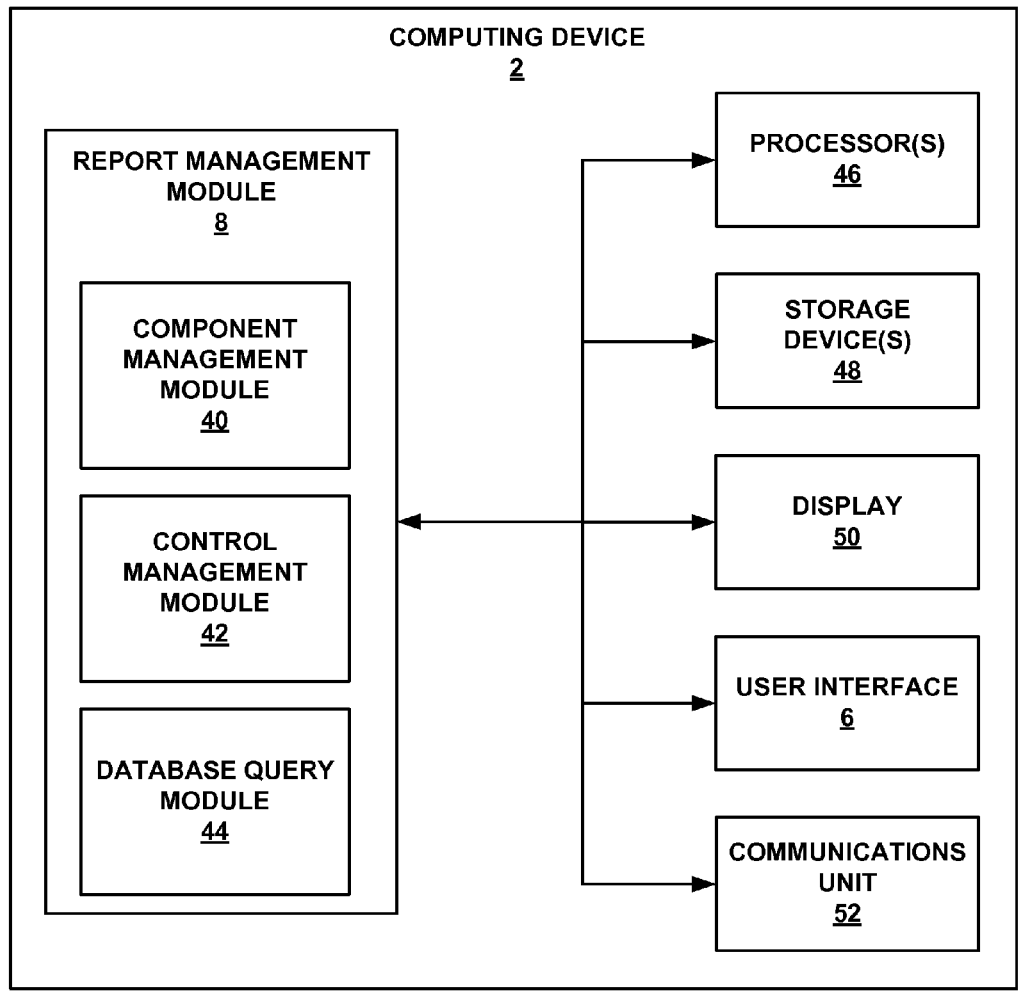
FIG. 2 is a block diagram illustrating an example computing device for dynamically generating control elements of a graphical user interface, in accordance with one or more aspects of this disclosure.

FIG. 2 is a block diagram illustrating an example computing device 2 for dynamically generating control elements of a graphical user interface, in accordance with one or more aspects of this disclosure. As illustrated in FIG. 2, computing device 2 may include report management module 8, one or more processors 46, one or more storage devices 48, display 50, user interface 6, and communication unit 52. Report management module 8 may include component management module 40, control management module 42, and database query module 44.

Computing device 2 may include additional components not shown in FIG. 2 for clarity. For example, if computing device 2 comprises a mobile computing device, computing device 2 may include a battery to provide power to the components of computing device 2. Similarly, the components of computing device 2 shown in FIG. 2 may not be necessary in every example of computing device 2. For instance, if database 10 is stored in one or more storage devices 48, computing device 2 may not include communications unit 52.

Although shown as separate components in FIG. 2, in some examples, one or more of component management module 40, control management module 42, and database query module 44 may be part of the same module. In some examples, one or more of component management module 40, control management module 42, database query module 44, and one or more processors 46 may be formed in a common hardware unit. In certain examples, one or more of component management module 40, control management module 42, and database query module 44 may be software and/or firmware units that are executed on or operable by one or more processors 46 to perform various techniques of this disclosure.

One or more processors 46 may include, in certain examples, any one or more of a microprocessor, a controller, a digital signal processor (DSP), an application specific integrated circuit (ASIC), a field-programmable gate array (FPGA), or equivalent discrete or integrated logic circuitry. In some examples, one or more storage devices 48 may store one or more instructions that cause one or more processors 46 and modules 8, 40, 42, and 44 to perform various functions ascribed to one or more processors 46, and modules 8, 40, 42, and 44.

One or more storage devices 48 may include any form of machine- or computer-readable media. For example, one or more storage devices 48 may include any volatile, non-volatile, magnetic, optical, or electrical media, such as a hard drive, random access memory (RAM), read-only memory (ROM), non-volatile RAM (NVRAM), electrically-erasable programmable ROM (EEPROM), flash memory, or any other digital media.

Display 50 may be a liquid crystal display (LCD), e-ink, organic light emitting diode (OLED), or other display. Display 50 may present the content of computing device 2 to a user. For example, display 50 may present a graphical user interface, a web browser, or other functions that may need to be presented to a user. In some examples, display 50 may be a touch screen that can allow a user to interact with the computing device 2.

User interface 6 may allow a user of computing device 2 to interact with computing device 2. Examples of user interface 6 may include, but are not limited to, a keypad embedded on computing device 2, a keyboard, a mouse, a roller ball, buttons, a touch screen, a graphical user interface, or other devices that allow a user to interact with computing device 2. In some examples, display 50 may present some or all of the functionality of user interface 6. For instance, display 50 may be a touch screen that can present a graphical user interface to allow a user to interact with computing device 2.

Communications unit 52, in these examples, provides for communications with other data processing systems or devices. In these examples, communications unit 52 is a network interface card. Communications unit 52 may provide communications through the use of either or both physical and wireless communications links.

In some examples, computing device 2 may cause user interface 6 to display a GUI that presents a report including a plurality of components. The components may display one or more members of at least one dimensional level of a database (e.g., database 10). Report management module 8 may determine a dimensional level of database 10 having one or more members displayed in two or more of the plurality of components, and may display a control element that includes an indication of the dimensional level having the one or more members displayed in each of the two or more components. As in the illustrated example of FIG. 2, report management module 8 may include component management module 40, control management module 42, and database query module 44.

Component management module 40 may cause user interface 6 to display a GUI including one or more components displaying one or more members of at least one dimensional level of database 10. For example, a user may group user interface elements (e.g., one or more drop-down lists, table elements, checkboxes, radio buttons, and the like) using the GUI. Component management module 40 may create the components, and may use database query module 44 to populate the component with information from database 10. For example, a user may create a cost data component to display the cost of a selectable product (e.g., selectable using a drop-down list of the component) for a selectable year. Component management module 40 may determine the dimensional levels and the dimensional member associated with each selection, and may use database query module 44 to retrieve information from database 10 to populate the component with information from database 10 associated with the selections.

For instance, a user may select, using the component, the 2000 dimensional member of the year dimensional level of the time dimension of database 10. In addition, the user may select the chemicals dimensional member of the materials dimensional level of the products dimension of database 10. Component management module 40 may use database query module 44 to retrieve information from database 10 associated with the intersection of the cost dimension, the 2000 dimensional member of the year dimensional level, and the chemicals dimensional member of the materials dimensional level. In such an example, component management module 40 may display the price data for the chemicals for the year 2000.

Control management module 42 may determine a dimensional level of a dimension of database 10 having one or more members displayed in two or more components, and may display a control element including an indication of the dimensional level having the one or more members displayed in each of the two or more components. Control management module 42 may receive a selection of a member of a dimensional level of the dimension using the control element. In response, control management module 42 may direct component management module 40 to update each of the components based on the selection of the member of the dimensional level.

As one example, control management module 42 may determine that two or more components of a GUI display one or more members of a year dimensional level of a time dimension of database 10. Control management module 42 may display a control element including an indication of the year dimensional level. For instance, the control element may be a drop-down list. The indication of the year dimensional level may be the text "all years," representing a textual description of the collection of members of the year dimensional level (e.g., 1999, 2000, and 2001 dimensional members). Control management module 42 may display the "all years" indication as a top-level member of the drop-down list that is visible when the drop-down list is displayed in an unselected state. The drop-down list may include the individual members of the year dimensional level (e.g., 1999, 2000, and 2001), and may enable a user to select the individual year.

In some examples, the drop-down list may include a graduated list that includes indications of multiple dimensional levels, members of the dimensional levels, intersections of dimensional levels, and the like. For instance, a control element such as a drop-down list may include members of a year dimensional level (e.g., 1999, 2000, and 2001 dimensional members). In addition, the drop-down list may include an indication of a quarter dimensional level (e.g., the text "all quarters"), members of the quarter dimensional level (e.g., Q1, Q2, Q3, and Q4), or intersections of the quarter dimensional level with the year dimensional level (e.g., 1999 Q1,1999 Q2,1999 Q3,1999 Q4,2000 Q1,2000 Q2, etc.). In some examples, the control element may include a graduated list includes indications all of the dimensional levels of the dimension (e.g., decade, year, quarter, month, week, day, hour, and the like). In other examples, the control element may include a graduated list including a configurable number of dimensional levels. For instance, a user may configure control management module 42 (e.g., using user interface 6) to display a graduated list including only a parent dimensional level and a child dimensional level of the dimensional level having one or more members displayed in the two or more components.

In certain examples, the control element may include an element such as a checkbox element that enables users to select individual members of the element. For instance, control management module 42 may determine that two or more components display one or more members of a year dimensional level. Control management module 42 may display a checkbox control element that includes the members of the year dimensional level and enables a user to select one or more of the displayed dimensional members (e.g., one or more of 1999, 2000, and 2001 dimensional members).

In some examples, the indication of the dimensional level having one or more members displayed in two or more of the components may include a member of a parent dimensional level of the dimensional level having one or more members displayed in two or more of the components. For instance, control management module 42 may determine that two or more components display members of the quarter dimensional level of a time dimension of database 10. Control management module 42 may display a control element (e.g., a drop-down list) including a member of the year dimensional level (i.e., the parent dimensional level of the quarter dimensional level). For instance, the two or more components may display the members of the quarter dimensional level (e.g., Q1, Q2, Q3, and Q4) that intersect with the 1999 member of the year dimensional level (e.g., 1999 Q1,1999 Q2,1999 Q3, and 1999 Q4). In response, control management module 42 may display a drop-down list, for example, that displays the 1999 member of the year dimensional level as the top-level visible member of the drop-down list.

In certain examples, control management module 42 may determine a second dimensional level of a second dimension having one or more members displayed in two or more components. For example, in addition to determining that one or more components display one or more members of a year dimensional level of a time dimension, component management module 42 may determine that one or more components display one or more members of a materials dimensional level of a products dimension of database 10. In response, component management module 42 may display a control element including an indication of the materials dimensional level of the products dimension.

The one or more components displaying the one or more members of the materials dimensional level of the products dimension (i.e., the second dimensional level of the second dimension) may be the same or different components than the one or more components displaying the one or more members of the year dimensional level. For instance, the GUI may include numerous components. As one example, control management module 42 may determine that a subset of two or more of the components displays one or more members of the year dimensional level, and the same subset of components displays one or more members of the materials dimensional level. As another example, control management module 42 may determine that a subset of components displays one or more members of the year dimensional level, and a different subset of components displays one or more members of the materials dimension. In some examples, the two subsets may overlap, in that some, but not all of the components display one or more members of both the year dimensional level and the materials dimensional level. In other examples, the two subsets may not overlap, in that none of the components displays members of both the year dimensional level and the materials dimensional level.

Similarly, control management module 42 may determine a third dimensional level having one or more members displayed in two or more components, a fourth dimensional level, and so on. Control management module 42 may display control elements including indications of each dimensional level having one or more members displayed in two or more components, or may display a configurable number of such control elements. For instance, a user may configure control management module 42 (e.g., using user interface 6) to display only a certain number of control elements, such as three control elements.

In some examples, control management module 42 may include in the indication of the dimensional level having the one or more members displayed in each of the two or more components, an indication of the number of components that display the one or more members of the dimensional level. For example, control management module 42 may determine that five components display one or more members of a year dimensional level of a time dimension, three components display one or more members of a materials dimensional level of a products dimension, and two components display one or more members of a cost dimensional level of a measures dimension. In such an example, control management module 42 may display control elements including indications of the three dimensional levels, and may display them in a sorted order, such as from left to right. For instance, control management module 42 may display the indication of the dimensional level that is present in the largest number of components (i.e., the time dimensional level in the current example) as the left-most indication, the indication of the dimensional level that is present in the next largest number of components (i.e., the materials dimensional level in the current example) to the right of the indication of the indication of the time dimensional level, and the indication of the dimensional level that is present in the least number of components (i.e., the cost dimensional level in the current example) to the right of the indication of the materials dimensional level.

In certain examples, control management module 42 may include an indication of the number of components that display the one or more members of the dimensional level by changing the size of the indications relative to the number of components that display the members of the dimensional levels. For instance, control management module 42 may increase the font size of the indications such that the dimensional level that is displayed in largest number of components is indicated with the largest font size, and the dimensional level that is displayed in the least number of components is indicated with the smallest font size.

After displaying the control element including an indication of the dimensional level having one or more members displayed in two or more components, control management module 42 may receive a selection of a member of a dimensional level of the dimension using the control element. For instance, in response to determining that two or more components display members of the year dimensional level of the time dimension of database 10, control management module 42 may display a drop-down list including the indication "all years," and may enable a user to select a member of the year dimensional level (e.g., 1999), a member of the quarter dimensional level (e.g., Q1), or a member of the quarter dimensional level that intersects with a member of the year dimensional level (e.g., 1999 Q1). A user may select a member of a dimensional level using the control element, and control management module 42 may direct component management module 40 to update each of the components based on the selection.

Control management module 42 may direct component management module 40 to update each of the components to display members of a child dimensional level of the member of the selected dimensional level. For example, a user may use the control element to select the 1999 member of the year dimensional level. Control management module 42 may direct component management module 40 to update each of the components that display one or more members of the year dimensional level to display the members of the quarter dimensional level (i.e., the child dimensional level of the year dimensional level) that intersect with the selected member of the year dimensional level (i.e. 1999 in the current example).

In certain examples, when a user selects an indication of a dimensional level using the control element (e.g., the textual indication "all years,") control management module 42 may direct component management module 40 to update each of the components to display members of the selected dimensional level. For instance, upon receiving a selection using the control element of the indication "all materials" of the materials dimensional level of the products dimension of database 10, control management module 42 may direct component management module 40 to update each of the components that display one or more members of the products dimension to display the members of the materials dimensional level of the products dimension (e.g., the dimensional members of the materials dimensional level including chemicals, packaging, parts, and the like).

Control management module 42 may display a control element that enables a user to select a different dimension of the database, and may update two or more components to cause them to display one or more members of a dimensional level of the selected dimension. For example, control management module 42 may determine that two or more components display one or more members of a year dimensional level of a time dimension, and may display a control element including an indication of the year dimensional level. The control element may enable a user to select a dimensional level of the time dimension. In addition, the control element may enable a user to select a different dimension, such as a products dimension of database 10. For instance, the control element may enable a user to type the name of the different dimension, may include one or more different dimensions in a drop-down list element, or may enable a user to browse to a list of available dimensions. Similarly, the control element may enable a user to select a dimensional level of a different dimension. In response to receiving the selection of the different dimension, control management module 42 may update each of the components displaying the one or more members of the dimensional level to cause the components to display one or more members of the newly selected dimension.

As such, computing device 2 may enable a user to efficiently update the displayed members of a dimensional level of a database in two or more components of a GUI, or to change the displayed dimension or dimensional levels using one selection of a control element that is generated and displayed by computing device 2. The control element may therefore contribute to an enhanced user experience and may allow a user to more effectively view data contained in a database.

FIGS. 3A and 3B are screen illustrations of example graphical user interfaces that include dynamically generated control elements 60 and 62, in accordance with one or more aspects of this disclosure. For purposes of illustration only, the example screen illustrations are described below within the context of computing device 2 of FIG. 1 and FIG. 2. Referring to FIG. 3A, an example GUI includes price component 64, cost component 74, and labor component 84. In the example of FIG. 3A, price component 64 displays members of a price dimensional level 66 of a measures dimension for materials 68 of a materials dimensional level of a products dimension for each of years 70 and 72 of a year dimensional level of a time dimension of database 10. Cost component 74 displays members of a cost dimensional level 76 of the measures dimension for materials 78 of the materials dimensional level of the products dimension for each of years 80 and 82 of the year dimensional level of the time dimension of database 10. Labor component 84 displays members of a labor hours dimensional level 86 of the measures dimension for divisions 88 of the division dimensional level of the geographic dimension for each of years 90 and 92 of the year dimensional level of the time dimension of database 10.

In the example of FIG. 3A, control management module 42 determines that two or more of components 64, 74 and 84 display one or more members of the time dimensional level of the time dimension of database 10. For example, in the illustrated example, each of components 64, 74 and 84 display the 1998 and 1999 dimensional members of the year dimensional level of the time dimension of database 10. In addition, control management module 42 determines that two or more of components 64, 74 and 84 display one or more members of the materials dimensional level of the products dimension of database 10 (i.e., materials 68 and 78).

Control management module 42 displays control elements 60 and 62, including indications of the dimensional levels having one or more members displayed in two or more components (i.e., the year dimensional level and the materials dimensional level). Because none of the price dimensional level 66, the cost dimensional level 76, the labor hours dimensional level 86, or the division dimensional level 88 are displayed in two or more components, control management module 42 does not display control elements including indications of those dimensional levels.

In the example of FIG. 3A, control element 60 is a drop-down list including the indication "ALL YEARS" of the year dimensional level that is displayed in each of components 64, 74 and 84. Control element 62 is a drop-down list including the indication "ALL MATERIALS" of the materials dimensional level that is displayed in each of components 64 and 74.

Referring to FIG. 3B, an example GUI includes price component 64, cost component 74, and labor component 84 (also illustrated in FIG. 3A). In the example of FIG. 3B, the 1999 dimensional member of the year dimensional level has been selected using control element 60. Control management module 42 receives the selection and directs component management module 40 to update each of the components that displayed one or more members of the year dimensional level to display the members of the child dimensional level of the year dimensional level. In the illustrated example, because each of components 64, 74, and 84 displayed members of the year dimensional level (the 1998 and 1999 dimensional members displayed in FIG. 3A), control management module 42 directs component management module 40 to update each of components 64, 74, and 84 to cause the components to display the members of the child dimensional level of the year dimensional level. As such, component management module 40 uses database query module 44 to retrieve information from database 10 associated with the selected dimensional members.

In the example of FIG. 3B, component management module 40 updates price component 64 to display members of the price dimensional level 66 for materials 68 of the materials dimensional level for each of the members of the quarter dimensional level 100, 102, 104, and 106 that intersect with the 1999 dimensional member of the year dimensional level. Similarly, component management module updates cost component 74 to display members of the cost dimensional level 76 for materials 78 of the materials dimensional level for each of the members of the quarter dimensional level 108, 110, 112, and 114 that intersect with the 1999 dimensional member of the year dimensional level. In addition, component management module 40 updates labor component 84 to display members of the labor hours dimensional level 86 for divisions 88 of the division dimensional level for each of the members of the quarter dimensional level 116, 118, 120, and 122 that intersect with the 1999 dimensional member of the year dimensional level.

Figure 4:
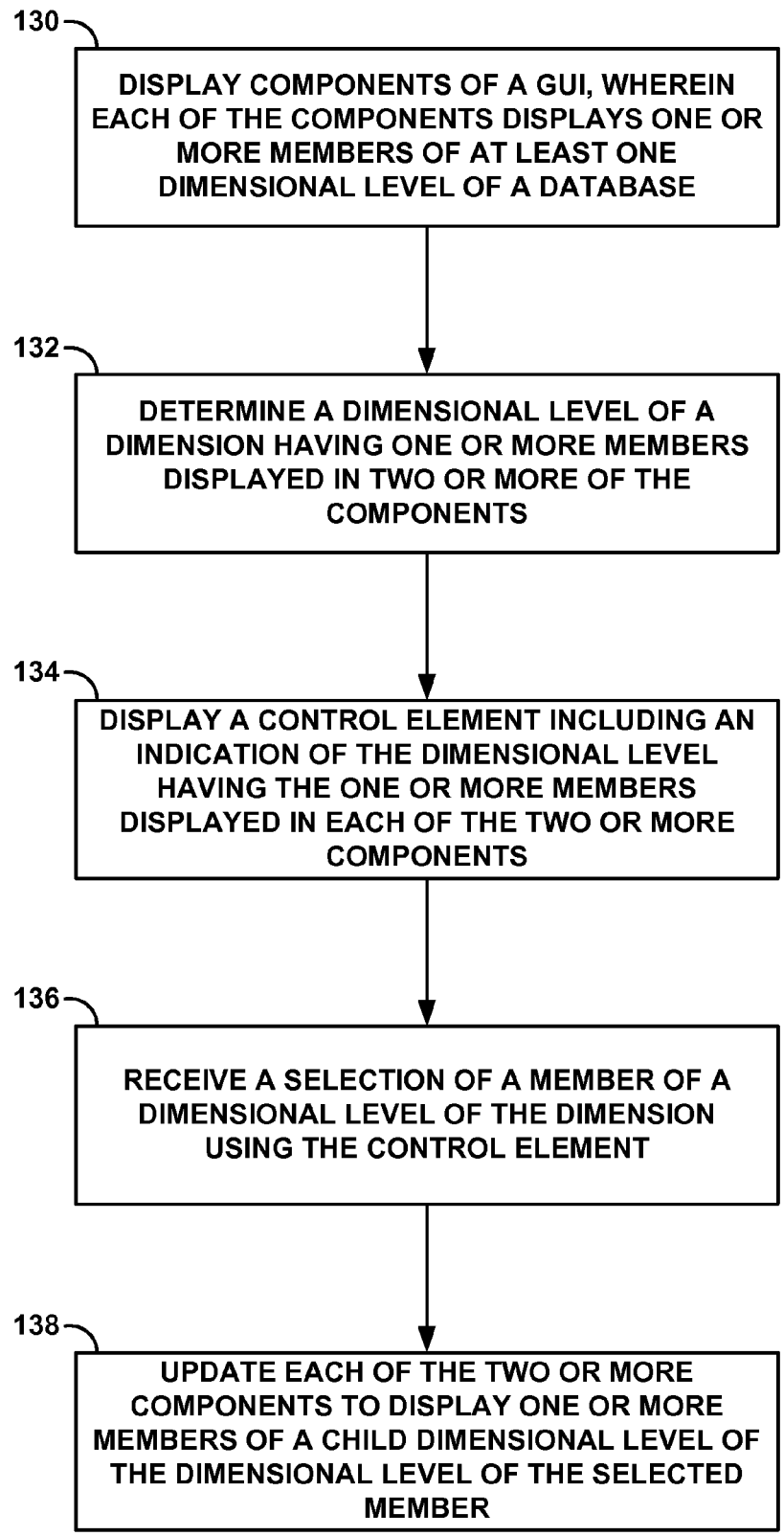
FIG. 4 is a flow diagram illustrating an example operation of a computing device for dynamically generating and displaying a control element, in accordance with one or more aspects of this disclosure.

FIG. 4 is a flow diagram illustrating an example operation of a computing device for dynamically generating and displaying a control element, in accordance with one or more aspects of this disclosure. For purposes of illustration only, the example operation is described below within the context of computing device 2 of FIG. 1 and FIG. 2. Control management module 42 may display a plurality of components (e.g., using display 50) of a graphical user interface, wherein each of the plurality of components displays one or more members of at least one dimensional level of a database (e.g., database 10) having a plurality of dimensions, and wherein each dimension of the plurality of dimensions includes one or more dimensional levels (130). For example, control management module 40 may display two or more components of a GUI that display one or more members of a year dimensional level of a time dimension of database 10 and one or more members of a materials dimensional level of a products dimension of database 10. Each of the time dimension and the products dimension may have one or more dimensional levels. For instance, the time dimension may include the year, quarter, month, week, day, and hour dimensional levels.

Control management module 42 may determine a dimensional level of a dimension having one or more members displayed in two or more of the plurality of components (132). For example, control management module 42 may determine that two or more of the plurality of components of the GUI display one or more members of a year dimensional level of a time dimension of database 10. For instance, two or more of the components may display the dimensional members 1999 and 2000 of the year dimensional level of the time dimension of database 10. Similarly, two or more of the components may display the chemicals and parts dimensional members of the materials dimensional level of the products dimension of database 10. The two or more components that display the one or more members of each dimensional level may be the same or different components.

Control management module 42 may display a control element (e.g., using display 50) including an indication of the dimensional level having the one or more members displayed in each of the two or more components (134). Examples of the control element include, but are not limited to, drop-down lists, checkbox elements, virtual buttons, and the like. In some examples, the indication of the dimensional level having the one or more members displayed in each of the two or more components may include a member of a parent dimensional level of the dimensional level having the one or more members displayed in each of the two or more components. For instance, two or more components may display one or more members of the intersection of a quarter dimensional level of a time dimension with a year dimensional level of the time dimension of database 10 (e.g., 1999 Q1,1999 Q2,1999 Q3,1999 Q4). Control management module 42 may include the dimensional member 1999 of the year dimensional level (i.e., the parent dimensional level of the quarter dimensional level) as the indication of the one or more displayed members of the quarter dimensional level. In certain examples, control management module 42 may include a textual description of the dimensional level having the one or more members displayed in the two or more components. For instance, if two or more components display one or more members of a year dimensional level, control management module 42 may include the indication "all years" as a textual description of the members of the displayed dimensional level.

Control management module 42 may receive a selection of a member of a dimensional level of the dimension using the control element (e.g., using user interface 6) (136). As an example, control management module 42 may display a graduated drop-down list including the members of one or more parent dimensional levels and/or one or more child dimensional levels of the dimensional level having one or more members displayed in two or more of the components. A user may select a member of a dimensional level of the dimension using the control element, such as by selecting one of the members of the parent or child dimensional levels included in the drop-down list.

Control management module 42 may cause component management module 40 to update each of the two or more components to cause the two or more components to display one or more members of a child dimensional level of the dimensional level of the selected member (138). For example, a user may select the 1999 dimensional member of the year dimensional level of the time dimension using the control element. Control management module 42 may cause component management module 40 to update each of the two or more components that display one or more members of the year dimensional level to display one or more members of the quarter dimensional level of the time dimension (i.e., the child dimensional level of the year dimensional level).

Figure 5:
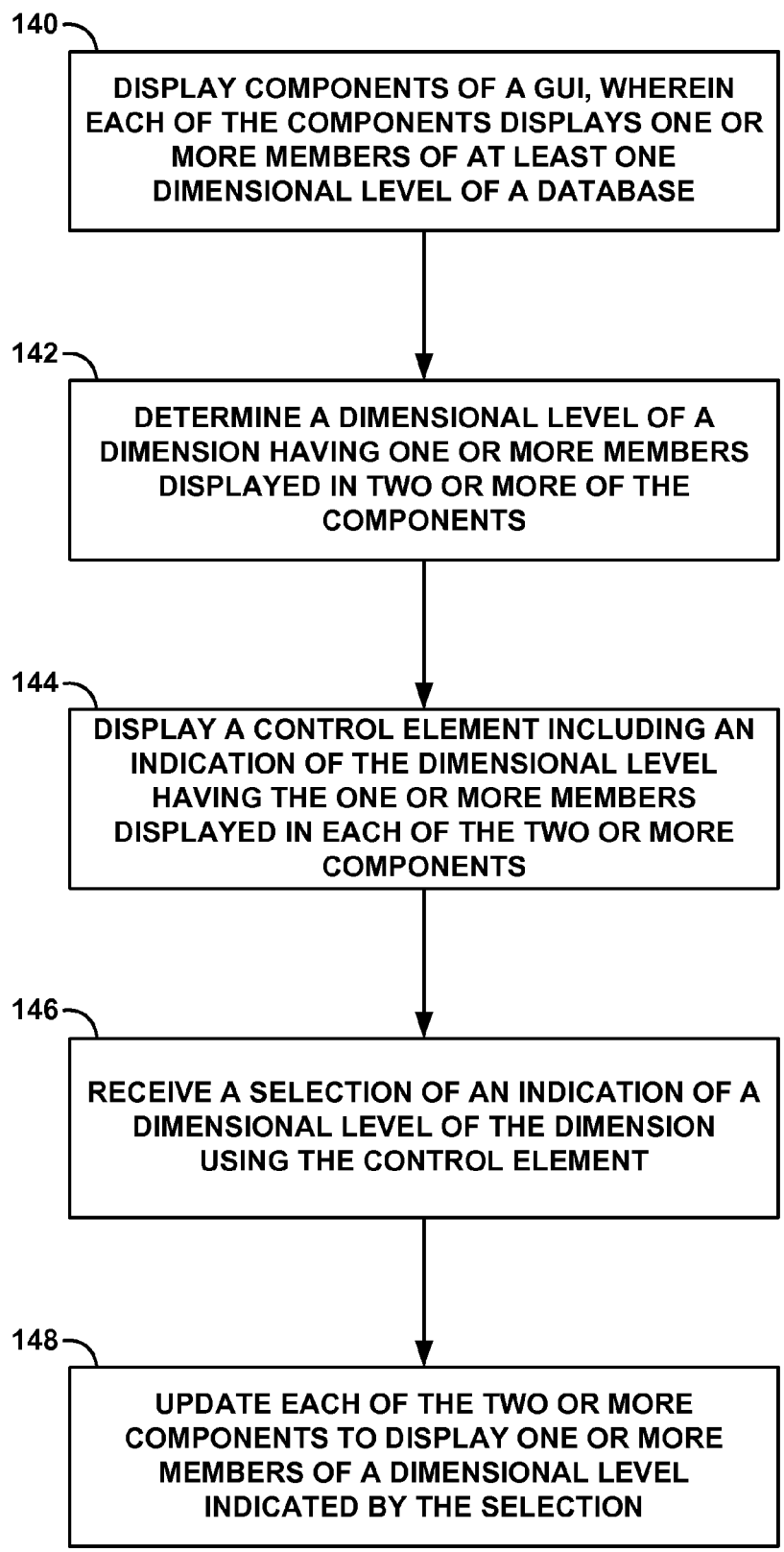
FIG. 5 is a flow diagram illustrating an example operation of a computing device for dynamically generating and displaying a control element, in accordance with one or more aspects of this disclosure.

FIG. 5 is a flow diagram illustrating an example operation of a computing device for dynamically generating and displaying a control element, in accordance with one or more aspects of this disclosure. For purposes of illustration only, the example operation is described below within the context of computing device 2 of FIG. 1 and FIG. 2. Control management module 42 may display a plurality of components (e.g., using display 50) of a graphical user interface, wherein each of the plurality of components displays one or more members of at least one dimensional level of a database (e.g., database 10) having a plurality of dimensions, and wherein each dimension of the plurality of dimensions includes one or more dimensional levels (140). For example, control management module 40 may display two or more components of a GUI that display one or more members of a division dimensional level of a geographic dimension of database 10.

Control management module 42 may determine a dimensional level of a dimension having one or more members displayed in two or more of the plurality of components (142). For example, control management module 42 may determine that two or more of the plurality of components of the GUI display one or more members of a state dimensional level of a geographic dimension of database 10. Control management module 42 may display a control element (e.g., using display 50) including an indication of the dimensional level having the one or more members displayed in each of the two or more components (144). For instance, control management module 42 may display a drop-down list element including the indication "all states," as an indication of the state dimensional level having the one or more members displayed in each of the two or more components.

Control management module 42 may receive a selection of an indication of a dimensional level of the dimension using the control element (146). For example, control management module 42 may display a drop-down list element including the indication "all states" of a state dimensional level, and may enable a user to select an indication of one or more dimensional levels of the geographic dimension using the control element. For instance, a user may select an "all cities" indication of the city dimensional level using the drop-down list element. Control management module 42 may cause component management module 40 to update each of the two or more components that display one or more members of the state dimensional to cause the two or more components to display one or more members of the cities dimensional level indicated by the selection.

As such, various aspects of this disclosure may enable a user to view data stored in a database, such as a multi-dimensional database, and to efficiently update the displayed members of a dimensional level of a database in two or more components of a GUI using a control element generated and displayed by computing device 2. The techniques described herein may enhance a user's experience when manipulating and viewing a GUI including numerous user interface components, and may enable the user to more effectively focus on the displayed data and relationships among the displayed data.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various aspects of the disclosure have been described. These and other aspects are within the scope of the following claims.

The invention claimed is:

1. A method comprising:
displaying, by a computing device, a plurality of components of a graphical user interface, wherein each of the plurality of components includes one or more members of at least one dimensional level of a multi-dimensional database having a plurality of dimensions and information associated with intersections of the one or more members of the at least one dimensional level of the multi-dimensional database with one or more members of another dimensional level of the multi-dimensional database, and wherein each dimension of the plurality of dimensions includes one or more dimensional levels that form a hierarchical structure within the respective dimension;
determining, by the computing device, a dimensional level of a dimension of the plurality of dimensions having one or more members displayed in two or more components of the plurality of components;
displaying, by the computing device, a control element including an indication of the dimensional level having the one or more members displayed in each of the two or more components;
receiving, by the computing device, a selection of an indication of a child dimensional level of the dimensional level of the dimension using the control element; and
in response to receiving the selection of the indication of the child dimensional level of the dimensional level of the dimension, updating, by the computing device, each of the two or more components such that the two or more components include one or more members of the child dimensional level of the dimensional level in place of the one or more members of the dimensional level displayed in each of the two or more components and information associated with intersections of the one or more members of the child dimensional level of the dimensional level with the one or more members of the another dimensional level of the multi-dimensional database in place of the intersections of the one or more members of the at least one dimensional level of the multi-dimensional database with the one or more members of the another dimensional level of the multi-dimensional database.

2. The method of claim 1, wherein the one or more members of the child dimensional level include the one or more members of the intersection of the selected member of the dimensional level and the members of the child dimensional level.

3. The method of claim 1, wherein the dimensional level of the dimension is a first dimensional level of the dimension, the method further comprising:
receiving, by the computing device, a selection of an indication of a second dimensional level of the dimension using the control element; and
updating, by the computing device, each of the two or more components to cause the two or more components to include one or more members of the second dimensional level indicated by the selection.

4. The method of claim 3, wherein the selection of the indication of the second dimensional level includes a selection of the indication of the intersection of the second dimensional level with a member of a parent dimensional level of the second dimensional level.

5. The method of claim 1, wherein the dimension is a first dimension of the multi-dimensional database, the method further comprising:
receiving, by the computing device, a selection of an indication of a second dimension of the plurality of dimensions of the multi-dimensional database; and
updating, by the computing device, the two or more components to cause the two or more components to include one or more members of a dimensional level of the second dimension.

6. The method of claim 1, wherein the dimension is a first dimension of the multi-dimensional database, the method further comprising:
determining, by the computing device, a dimensional level of a second dimension of the plurality of dimensions having one or more members displayed in two or more of the plurality of components; and
displaying a control element including an indication of the second dimensional level of the second dimension having one or more members displayed in two or more of the plurality of components.

7. The method of claim 6, wherein the dimensional level of the second dimension is a first dimensional level of the second dimension, the method further comprising:
receiving, by the computing device, a selection of an indication of the second dimensional level of the second dimension using the control element; and
updating, by the computing device, each of the two or more components to cause the two or more components to display one or more members of a child dimensional level of the second dimensional level of the selected member.

8. The method of claim 6, further comprising:
receiving, by the computing device, a selection of an indication of a third dimensional level of the second dimension using the control element; and
updating, by the computing device, each of the two or more components to cause the two or more components to include one or more members of the third dimensional level indicated by the selection.

* * * * *